US 8,228,931 B1

(12) United States Patent
Wallace et al.

(10) Patent No.: US 8,228,931 B1
(45) Date of Patent: Jul. 24, 2012

(54) DISTRIBUTED VIRTUAL STORAGE SWITCH

(75) Inventors: Raymond Bruce Wallace, Ashton (CA);
Thomas P. Chmara, Richmond (CA);
Ryan Stark, Ottawa (CA)

(73) Assignee: Ciena Corporation, Linthicum, MD (US)

( * ) Notice: Subject to any disclaimer, the term of this patent is extended or adjusted under 35 U.S.C. 154(b) by 1807 days.

(21) Appl. No.: 10/891,992

(22) Filed: Jul. 15, 2004

(51) Int. Cl.
*H04L 12/54* (2006.01)

(52) U.S. Cl. ......... 370/428; 370/468; 370/477; 709/213

(58) Field of Classification Search .................. 709/212, 709/213, 217; 370/400, 404, 258, 452, 412, 370/428
See application file for complete search history.

(56) References Cited

U.S. PATENT DOCUMENTS

| | | | | |
|---|---|---|---|---|
| 4,577,313 A | * | 3/1986 | Sy ................................. | 370/403 |
| 4,872,157 A | * | 10/1989 | Hemmady et al. ............. | 370/400 |
| 5,996,024 A | * | 11/1999 | Blumenau ...................... | 719/326 |
| 6,304,552 B1 | * | 10/2001 | Chapman et al. .............. | 370/232 |
| 6,470,397 B1 | * | 10/2002 | Shah et al. ..................... | 709/250 |
| 6,594,279 B1 | * | 7/2003 | Nguyen et al. ................. | 370/468 |
| 6,687,225 B1 | * | 2/2004 | Kawarai et al. ............ | 370/230.1 |
| 6,807,581 B1 | * | 10/2004 | Starr et al. ...................... | 709/250 |
| 6,839,356 B2 | * | 1/2005 | Barany et al. .................. | 370/401 |
| 7,031,904 B1 | * | 4/2006 | Wilson et al. .................. | 709/230 |
| 7,099,922 B2 | * | 8/2006 | Pospesel et al. ............... | 709/208 |
| 7,130,264 B2 | * | 10/2006 | Wiebe et al. ................... | 370/225 |
| 7,167,483 B1 | * | 1/2007 | Sharma et al. ................. | 370/442 |
| 7,167,648 B2 | * | 1/2007 | Heinz et al. ...................... | 398/58 |
| 7,197,047 B2 | * | 3/2007 | Latif et al. ..................... | 370/466 |
| 7,215,679 B2 | * | 5/2007 | Pugel .............................. | 370/412 |
| 7,289,499 B1 | * | 10/2007 | Chinn et al. ................... | 370/389 |
| 7,292,567 B2 | * | 11/2007 | Terrell et al. .................. | 370/363 |
| 7,295,572 B1 | * | 11/2007 | Haapala ......................... | 370/466 |
| 7,369,514 B1 | * | 5/2008 | Peng et al. ..................... | 370/258 |
| 2002/0064163 A1 | * | 5/2002 | Fujiyama et al. ............. | 370/400 |
| 2003/0072268 A1 | * | 4/2003 | Nishimura et al. ........... | 370/252 |
| 2003/0084219 A1 | * | 5/2003 | Yao et al. ...................... | 710/300 |
| 2004/0083284 A1 | * | 4/2004 | Ofek et al. ..................... | 709/224 |
| 2005/0240713 A1 | * | 10/2005 | Wu et al. ........................ | 710/314 |
| 2006/0031312 A1 | * | 2/2006 | Ellanti et al. .................. | 709/206 |
| 2008/0253395 A1 | * | 10/2008 | Pandya .......................... | 370/469 |

* cited by examiner

*Primary Examiner* — Andrew Chriss
*Assistant Examiner* — Roberta A Shand
(74) *Attorney, Agent, or Firm* — Christopher & Weisberg, P.A.

(57) ABSTRACT

An architecture that enables distributed storage capacity to be shared as though accesses were being made to a Fiber Channel Switch is described. The distributed capacity may include Fiber Channel devices and thus a method for addressing Fiber Channel devices coupled in a resilient ring has been provided. Expected Fiber Channel behavior and reliability are attained in the architecture of this invention through the application of bandwidth provisioning and extended reach mechanisms at each node in the ring. The bandwidth provisioning mechanisms ensure that access is provided to the communication links of the ring for each node according to a defined bandwidth distribution. The extended reach mechanisms of the invention ensure that the standard Fiber Channel packet delivery assumptions are satisfied. The solution exploits native ring characteristics to deliver customer separation and management of the resulting storage network. Forwarding Error Correction techniques can be used to ensure that a Bit Error Rate of the Fiber Channel communications on the ring is comparable to a Bit Error Rate of a typical Fiber Channel network.

31 Claims, 9 Drawing Sheets

DISTRIBUTED VIRTUAL STORAGE SWITCH

FIELD OF THE INVENTION

This invention relates generally to the field of networking and more particularly to a network architecture which permits data storage protocols to share capacity between nodes in a metro network.

BACKGROUND OF THE INVENTION

As it is known in the art, Storage Area Network (SAN)s are often used by various entities to consolidate or backup data. The consolidation of storage is important from both cost-savings and data security standpoints. A centralized data storage location removes the need for expensive storage devices to be provided at each user locale; rather storage capacity at the data center can be shared by a number of different servers at physically different locations. The data center is often physically distant from the application servers and associated users, and can be used to provide redundant storage for application data to ensure that desired levels of data security and disaster recovery can be maintained. The data center includes one or more storage systems, where the storage system could be RAID, tape backup, tape library, CD-ROM library, or JBOD (Just a Bunch of Disks).

FIG. 1 illustrates a typical application environment which includes a number of users 2 coupled via a WAN such as IP network 4 to a number of application servers 6. The application servers are coupled by a Fibre Channel network 8 to a data center 9 which may include one or more types of Fibre Channel storage devices. Fibre Channel is a serial data transfer architecture developed by a consortium of computer and mass storage device manufacturers, and is the preferred network implementation for SANs.

To deliver the required behavior, the application servers 6 generally include functionality to support the WAN protocol (for communication with the users), the Fibre Channel protocol (for communication with the data centers), and potentially LAN functionality to permit communication with the local area network of servers. Each of the networks must be managed, and management may be by different' entities. Thus the expense of supporting and managing the multiple networks is substantial. In addition, the solution allows the network owner to reapply valuable assets and capacity to deliver added value. It would be desirable to identify a network architecture that would permit network capacity to be shared among users in a metro network while enabling desired levels of performance and disaster recovery to be maintained.

SUMMARY OF THE INVENTION

According to one aspect of the invention, a distributed virtual switch includes a plurality of metro spaced nodes, wherein the metro spaced nodes are physically coupled in a ring such that data is transferred from node to node around the ring; and means for establishing logical point to point connections between at least two nodes in the ring for the transfer of storage protocol packets between the at least two nodes.

According to another aspect of the invention, a distributed virtual Fibre channel switch includes a plurality of nodes interconnected by two counter-rotating rings in a manner similar to the Resilient Packet Ring (RPR) architecture. Each node in the ring communicates with other nodes within the ring by launching a communication to the destination node using a message forwarding protocol. The message forwarding protocol adds a message header which stores a destination node identifier for the packet. The communication transits intermediate nodes in the ring until receipt at the destination node indicated in the message forwarding header. At the receiving node, the header is stripped from the packet and the packet may be processed according to the protocol agreed to by both source and destination devices. Such an arrangement permits multiple devices communicating with different protocols to share capacity on the ring. For example, the protocols could include Fibre Channel, IP or other type of protocol. Each node can communicate with any other node in the ring that implements the same user-side protocol in this manner and thus distributed storage capacity at each of the nodes in the ring may be shared as though point to point connections were available to the nodes via a switch.

In one embodiment the shared capacity is comprised of storage devices which operate according to a storage protocol such as the Fibre Channel protocol, and thus Fibre Channel packets are encapsulated within a protocol structure. This encapsulation may only involve prefixing the packet with a message forwarding header; or may include a trailer portion without loss of generality. Expected Fibre Channel behavior and reliability are attained in the architecture of this invention through the application of bandwidth provisioning and extended reach mechanisms at each node in the ring. The bandwidth provisioning mechanisms ensure that access is provided to the communication links of the ring for each node according to a defined bandwidth distribution, level of service and robustness of connections for the node. The extended reach mechanisms of the invention ensure that the standard Fibre Channel packet delivery assumptions are satisfied. Forwarding Error Correction techniques can be used to ensure that a Bit Error Rate of the Fibre Channel communications on the ring is comparable to or less than the Bit Error Rate of a typical Fibre Channel network.

The message forwarding protocol also permits various functionality, such as customer separation and service level controls to be easily implemented in a system including both LAN/WAN and Fibre Channel devices. Customer separation may be achieved through the application of virtual address space in the carrier network. The customer separation allows the secure and private delivery of each customer's traffic, and the application of individual service level agreements across customer boundaries. With such an arrangement, the architecture of the present invention permits unification of the various protocols including a SAN network, permitting distributed capacity to be directly streamed to a coupled device without intermediate switch interference.

According to one aspect of the invention, a storage node includes a local interface for exchanging data with one or more coupled storage devices; and a ring interface for exchanging communications with at least one metro connected node, the communications having a message forwarding protocol incorporating a storage protocol of the storage devices.

According to another aspect of the invention, a distributed virtual switch comprises a plurality of nodes interconnected in a ring, at least one of the nodes being a storage node operating according to a storage protocol; means, at each of the nodes, for exchanging packets with the storage node, the packets comprising communications in accordance with the storage protocol, wherein the means for exchanging includes means for translating a first packet delivery behavior of the ring into a second packet delivery behavior of the storage protocol.

A method of transporting storage communications associated with a storage protocol between remotely distributed nodes coupled in a ring includes the step of translating a packet delivery behavior of the ring into an expected packet delivery behavior of the storage protocol such that it appears that the nodes on the ring are point to point coupled.

According to another aspect of the invention, a distributed virtual switch includes a plurality of metro spaced nodes, wherein the metro spaced nodes are coupled in a ring and wherein a physical capacity of the ring is shared by a plurality of logical point to point connections between nodes on the ring and at least one of the nodes is a storage node, and wherein storage protocol packets are encapsulated according to a message forwarding protocol of the ring and forwarded to the at least one of the nodes.

DETAILED DESCRIPTION

Figure 1:
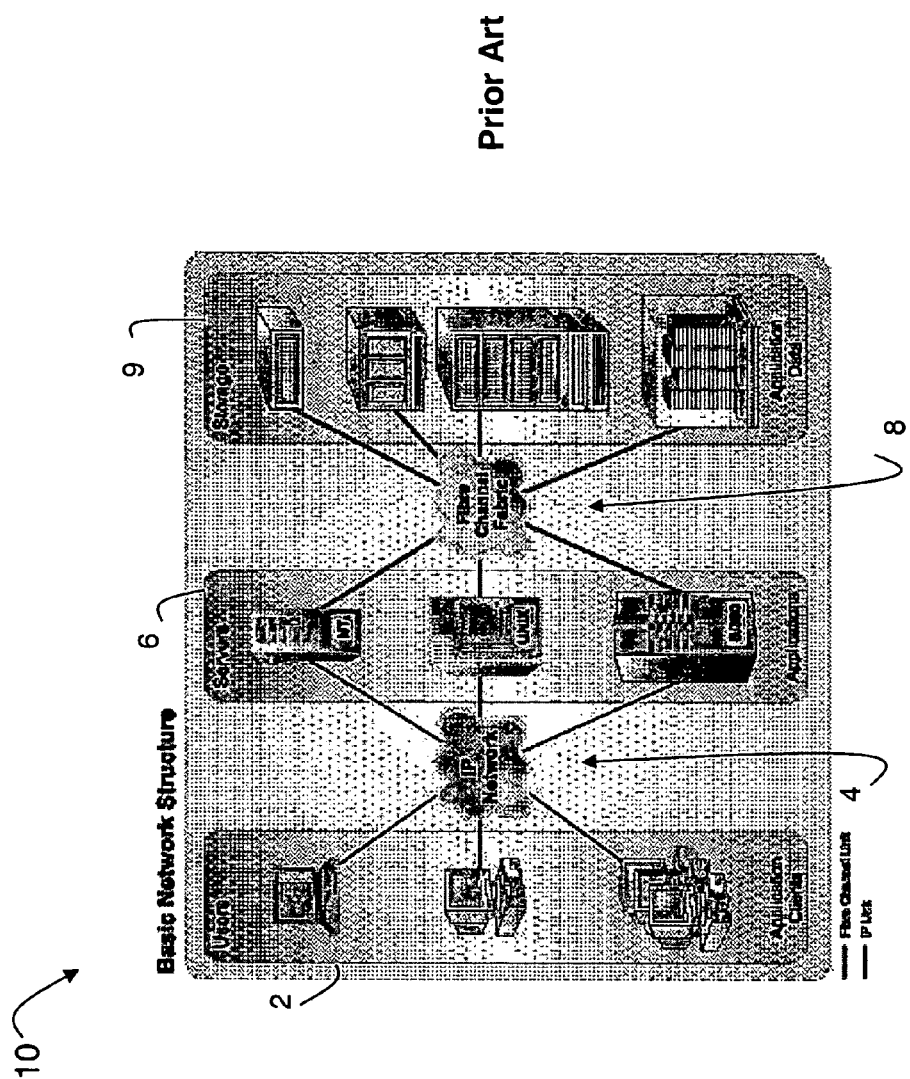
FIG. 1 is a block diagram illustrating a typical application network including a Storage Area Network (SAN) architecture.
Figure 2:
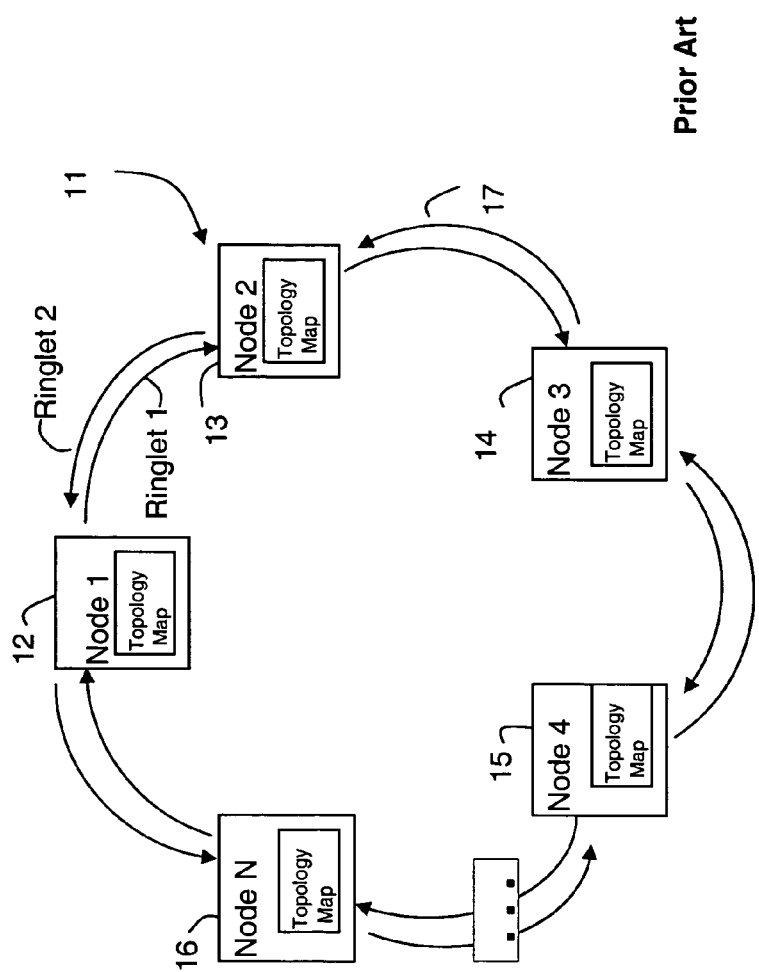
FIG. 2 is a block diagram of a Resilient Packet Ring (RPR)

FIG. 2 illustrates a block diagram of a basic Resilient Packet Ring (RPR) architecture 11 as defined by the IEEE 802.17 Resilient Packet Ring Standard, incorporated herein by reference. The RPR standard defines a media access control (MAC) protocol to control the manner in which available bandwidth is used by transmitting nodes. The basic architecture includes a number of counter rotating ringlets, such as ringlet 1 and ringlet 2 in FIG. 2, which couple a number of nodes into a ring arrangement. Each portion of the ring, such as portion 17 that couples node 2 to node 3, is referred to hereinafter as a 'span' and at least two of the nodes are 'metro connected.' For the purposes of this patent application, two nodes are 'metro connected' either if the connection between the nodes exceeds a 10 Kilometer distance or if the link connecting the nodes is a shared medium, for example shared on a wavelength (DWDM), time slot (as in Sonet) or packet-plane granularity.

At a given time, each node transmits a packet onto its coupled downstream span to the nearest downstream neighbor. Transmission within each ring is uni-directional in either a clock wise or counter-clock wise direction. A node that initiates a transmission is said to be an upstream node, and any subsequent node that receives the transmission, as it traverses the ring, is said to be downstream from the upstream node.

Each node has a layer 2 MAC address. A node can send packets to a single other node within a unicast destination address, or to multiple nodes with a multicast destination address. When sending a unicast packet, the source determines which ringlet is used based on information containing in a topology map. When the packet arrives at its destination, it is removed from the ring, and thus bandwidth is consumed only on the spans between the source and the destination. In order to reach the destination, the packet may need to be forwarded by nodes between the source and destination. For the purposes of this specification, nodes that are disposed between a source and destination node during a communication are said to be intermediate nodes, and the forwarding of a packet through these nodes without alteration or modification by the intermediate node is hereinafter referred to as the packet 'transiting' through the intermediate node.

The remaining spans on the ring before and beyond those used in this transmission remain idle and available for use in other transmissions, thus resulting in spatial re-use that results in an overall bandwidth capacity of the ring that exceeds the available instantaneous bandwidth capacity of a single span over the entire ring. In essence the nodes in a RPR ring serve as Add Drop Multiplexers (ADMs) which serve to either forward data transited through the node, or adding or dropping local traffic at the node.

Figure 3:
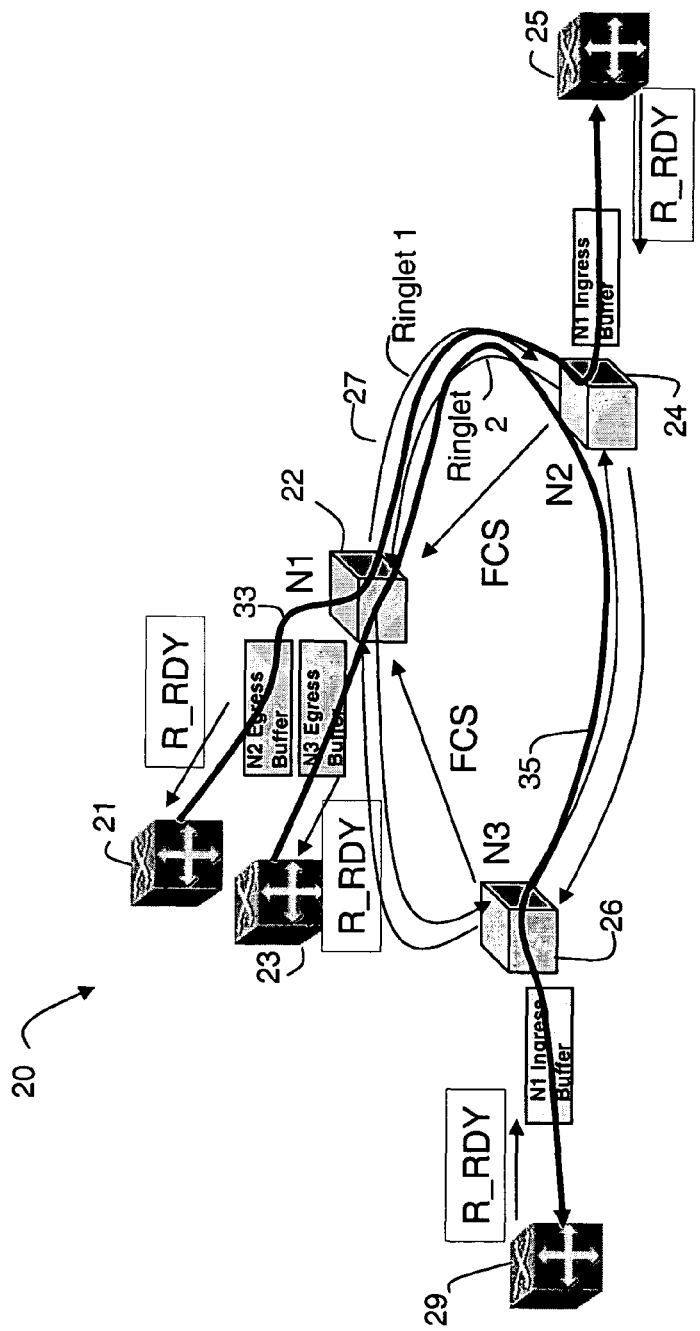
FIG. 3 is a block diagram provided to illustrate a distributed virtual Fibre channel switch architecture of the present invention.

Referring now to FIG. 3, an exemplary architecture of the present invention is shown to use the basis of the RPR connection technology to facilitate the sharing of distributed capacity between multiple nodes in a metro network using modified storage protocol commands. For example, FIG. 3 illustrates a node N1 22 coupled to nodes N2 and N3 via a RPR-type connection. Each node may potentially be coupled to additional storage devices (not shown) via storage device switches, such as Fibre Channel switches 21, 23 and 25.

Message passing between any two nodes in a ring is achieved by forwarding the message from the source node through any intermediate nodes to the destination node on the ring. Because messages may be passed between any nodes in the ring, the system in essence provides a distributed virtual Fibre channel switch.

As mentioned above, messages are exchanged between any of the nodes in the ring using a message forwarding protocol. The message forwarding protocol extends ring control to deliver the behavior of potentially multiple logical storage protocol associations, thereby permitting storage protocol (like the Fibre Channel protocol) communication between any of the nodes coupled in the ring. As will be described in more detail below, because the nodes need not be physically proximate, the message forwarding protocol incorporates extended reach functionality to overcome latency issues associated with long range Fibre Channel communication.

The resulting architecture is a distributed virtual Fibre Channel switch capable of leveraging several features of a Resilient Packet Ring (RPR) technology. The features of an RPR network that are leveraged by this architecture include the ability to share capacity between many sites, the ability to provision bandwidth by controlling access (both fairly and unfairly) to the carrier capacity by each of the nodes, addressing techniques that support robust customer separation and the ability to offer dedicated SLAs on a per customer basis.

For example in FIG. 3 node N1 22 is shown coupled to two Fibre Channel Switches 21 and 23. Each Fibre Channel switch may be coupled to one or more storage type devices such as RAID, tape backup, tape library, CD-ROM library, or JBOD (Just a Bunch of Disks (not shown). Each node may include one or more egress buffers for storing data destined for another node in the network, and one or more ingress buffers for storing data received from another node in the network. For example, node N1 22 is shown to include two egress buffers for storing communications destined for nodes N2 24 and N3 26. Nodes N2 24 and N3 26 are each shown to including an ingress buffer for storing communications from Node N1. As will be described in more detail below, extended reach flow control signals are used to control the flow of data between an egress buffer of one node and an ingress buffer of another node in point to point relation. With such an arrangement, the present invention allows the storage capacity that is available at node N1 22 to be shared by other nodes coupled within the ring. For example, data associated with FC switch 25 may be mirrored through node N1 22 by storage coupled to FC switch 21. FIG. 3 illustrates a communication path 33 enabling switch 25 to access mirrored data from node N1. Communication path 35 may be used to forward data from either of the FC switches 21 and 23 to N3 26. Using the concepts of the present invention described below, Fibre Channel communications can be directly forwarded from Fibre channel switch 21 through the nodes 22 and 24 to Fibre channel switch 25 (and the associated end point) as a virtual a point to point connection.

The present invention includes a number of mechanisms which permit the Fibre Channel communications to be forwarded with a desired reliability and behavior over the ring network. In general the mechanisms exploit a bandwidth provisioning mechanism for selecting which one of a group of communications at a node is to be transited out during a given time span. The bandwidth provisioning mechanism takes into account the service levels and robustness associated with each point to point connection between nodes in the ring. When the packet is selected for transit, an address mechanism is used to identify one or more destination node for a communication transmitted on the ring. As will be described in more detail below, the address mechanism can be used to provide customer separation capabilities to the ring. Once the packet and destination(s) is (are) identified, an extended reach mechanism is used to control the transmission of the packet to the identified destination in accordance with Fibre Channel standard delivery assumptions. Optional error correction techniques may advantageously be performed to satisfy service level guarantees. Each of the bandwidth provisioning, addressing, extended reach and optional error checking mechanisms will now be described in more detail below.

1. Mechanisms for Bandwidth Provisioning

In a ring based system such as that of FIG. 3, there may be many different logical communication links that share a common physical link, and thus consideration must be given to which communications are selected, at any given time, for forwarding out onto the ring. For example, in FIG. 3 link 27 is used both in the N1→N2 and N1→N3 communication paths. According to one aspect of the invention, a bandwidth allocation mechanism allocates an identified share of link bandwidth in the system to reduce the chances of starvation by a node.

The bandwidth allocation mechanism views each communication between two nodes in the ring as a point to point communication. Bandwidth provisioning is performed according to the contracted level of service and robustness associated with the point to point connection. For illustration and without loss of generality, one could offer three levels of service: A, where capacity is reserved for carriage of that traffic stream; B, where capacity is offered to subscribers either on a priority or round-robin basis; and C, where capacity is offered on a best-effort basis. The bandwidth allocation uses the service level agreements and robustness information when performing bandwidth provisioning in both directions around the ring.

In a typical Fibre channel switch, each server can access any one of the Fibre channel devices. Thus a distributed virtual Fibre Channel switch should include functionality that enables each node in the ring to gain access to any of the other resources of the ring. In one embodiment, described in pending patent application Ser. No. 10/636,037 filed Aug. 7, 2003 by Peng, entitled "Source Credit Based Fairness Scheme", incorporated herein by reference, a bandwidth provisioning mechanism allocates a tax to each of the nodes in the ring. For each packet that is to be transmitted by a sending node through the ring, the sending node must also transmit a number of 'tax' or 'dummy' packets onto the ring. The dummy or tax packets are marked with a header indicating that they do not actually contain data that needs to be delivered to a destination. Thus, the dummy/tax packets provide slots within the channel into which a downstream node can insert packets. With this arrangement a transmitting node releases a certain number of transmission opportunities to other nodes within the ring in order for it to be permitted to transmit on the ring.

Figure 4:
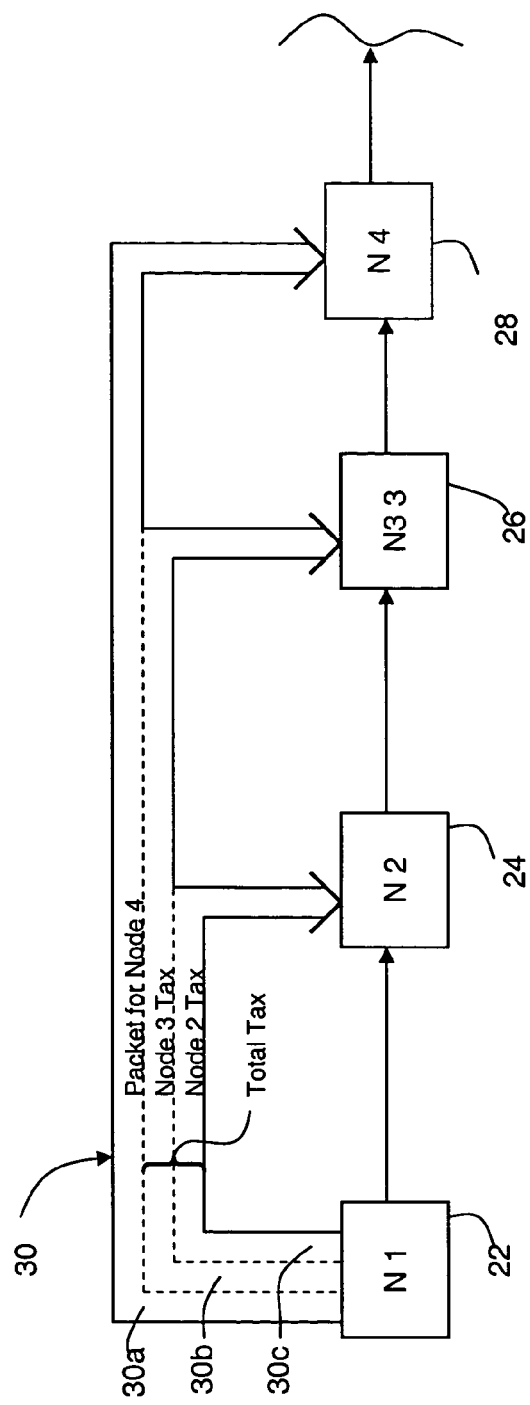
FIG. 4 is a conceptual diagram provided to illustrate the apportionment of bandwidth in the ring connection of the virtual switch of FIG. 3.

Referring now to FIG. 4, a conceptual flow diagram provided for indicating the provisioning of bandwidth to intermediate nodes on the ring will now be described. When node N1 22 has data to forward to node N4 28, the packet transits through node N2 24 and node N3 26 before reaching the destination node N4. In order to ensure that nodes N2 and N3 do not become starved for network resources, a certain amount of bandwidth is allocated to node N2 (node N2 tax) and node N3 (node N3 tax) for each transmission to node N4. The amount of bandwidth is referred to as a 'tax' that is to be paid to the intermediate nodes, to in essence 'pay' for the ability to transit traffic through the node. As mentioned above, the tax is paid by forwarding dummy frames to the intermediate nodes. When an intermediate node receives the dummy frame, it can replace the dummy frame with data that it seeks to transmit. By providing the dummy frames to the intermediate nodes it can be guaranteed that intermediate nodes do not become starved for network resources.

The tax may be paid in a variety of manners. For example, the protocol may be defined to ensure that dummy frames are always paid prior to the use of the transit data paths of the intermediate nodes by the transmitting node. Alternatively, the dummy packets may be interspersed with the communication between node N1 and N4, or may be paid after communication is complete. The exact manner by which the dummy packets are distributed to the intermediate nodes is a matter of design choice; the fact that they are paid at some point ensures that the node will have the opportunity to transmit its own data on the span. Over a larger time period the small variation average out to the desired value.

According to one aspect of the invention, the amount of 'tax' that is paid for each communication is made programmable to the network administrator. In Peng, the attributes include a Reserved Bandwidth, a Guaranteed Bandwidth and a Weight, although other attributes that control the bandwidth allocated to the node may be substituted and made accessible to a network controller by those of skill in the art. For example, as mentioned above, the service level agreement and robustness information (Platinum, Gold, Siver Dirt) associated with the links could be incorporated into the link control logic of Peng for bandwidth provisioning purposes.

It should be noted that the above describes only one exemplary method of performing bandwidth provisioning in a ring network. Any other method capable of the controlled distribution of bandwidth may alternatively be used, and thus the present invention is not limited to the disclosed embodiment.

2. Addressing Mechanism

As mentioned above, according to one aspect of the invention the message forwarding protocol formats a packet 50 for transmission on the ring network by encapsulating a Fibre Channel packet 52 within a message forwarding header 54, wherein the message forwarding header can be of any protocol that includes a destination address and controls the forwarding of the packet into the network. Pending patent application Ser. No. 09/624,051, entitled "Applications for Networked Storage Systems", filed Jul. 24, 2000 by Wallace et al, incorporated herein by reference, describes such a system. In addition, the scheme may be extended for use in systems interested in customer separation to preserve data integrity and privacy. Such an addressing scheme is described with reference to a storage system described in pending patent application Ser. No. 09/822,181, entitled "Architecture and Addressing Scheme for Storage Interconnect and Emerging Storage Service Providers" filed Apr. 2, 2001 by Ellis et al, also incorporated herein by reference. In both systems, transactions between nodes related to data storage access may be expressed in a non-network protocol (or storage protocol) and transmitted via a network protocol data unit across at least a portion of the network by encapsulating the storage protocol transaction within a network header such as message forwarding header, where the message forwarding header is selected according to a desired connection protocol for the network.

Accordingly, depending upon the connection protocol selected, different types of encapsulation headers may be used. The use of an encapsulating header provides a name space which can easily be managed by a service provider; enabling the service provider to control the data integrity and security offered to the consumer. In addition, the use of the encapsulation header allows the connection of multiple Fibre Channel networks that may have overlapping identifiers, without risk of confusion or misconnect. By way of example, several different types of addressing schemes that may be used in the present invention to provide encapsulation header functionality will now be described.

a). Fibre Channel Arbitrated Loop (FC-AL)

Figure 5:
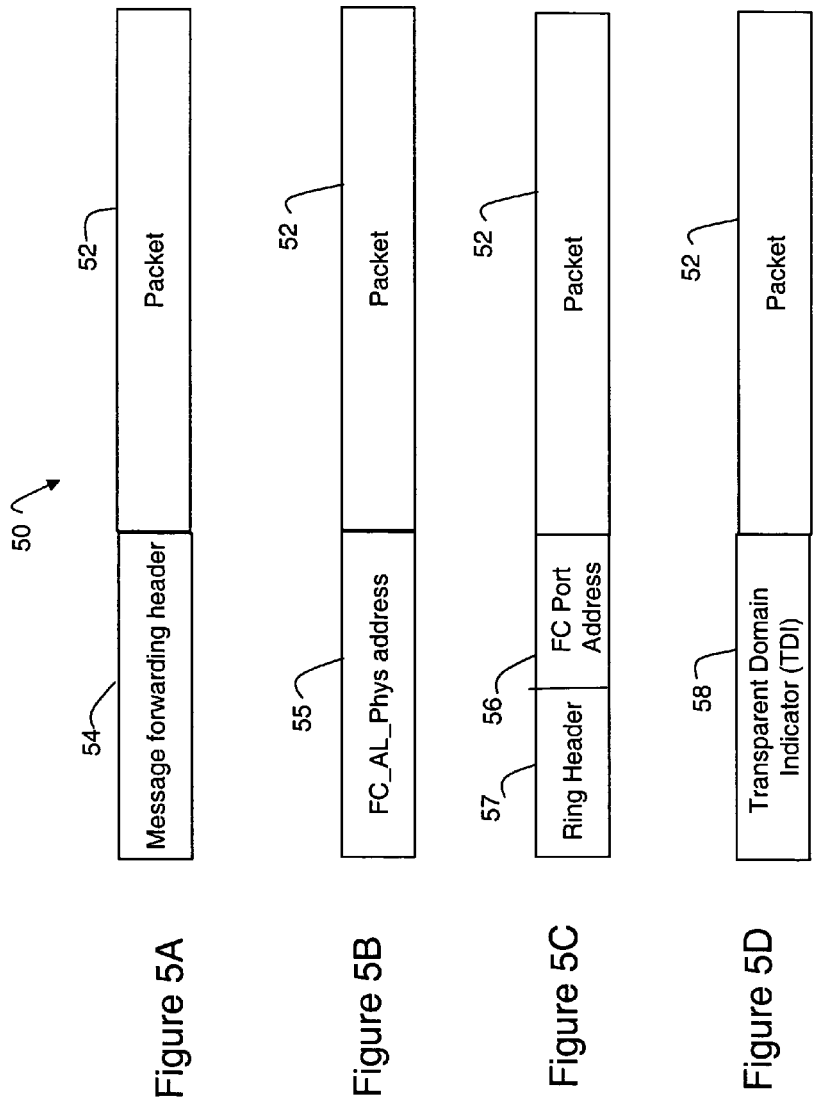
FIGS. 5a-5d are packet frame diagrams illustrating exemplary header contents for packets that may be forwarded in the ring connection of the virtual switch of FIG. 3.

In the embodiment of FIG. 5B the message forwarding protocol may use header information as defined by the Fibre Channel Arbitrated Loop protocol standard as defined by the National Standard for Interconnect Technology in NCITS xxx-200x T11/Project 1133D/Rev 7.0 entitled "Fibre Channel Arbitrated Loop FC-AL-2", Oct. 23, 2001, incorporated by reference herein. FC-AL addressing works generally as described below.

FC-AL devices may have an interface connector for attachment to backplanes in storage cabinets. This connector provides 7 pins for delivering an address to the device. In general the 7 bits provide Loop Identifiers that are used to map to physical addresses of the nodes within the ring. Each node uses the Loop Identifier as the destination address in the message forwarding header.

FC-AL addressing thus permits each destination node/port in a given users service to be enumerated and addressed per FC-AL schemes User can then use FC-AL services on SAN switch ports to automatically assign addressing. FC services with FC-RPR can then use the FC-AL address header to determine forwarding and egress port. Ports on user devices connected to the FC-RPR will take on FC-FL (loop) and FC-NL (non-loop) personalities. Use of FC-AL in this way provides a method to maintain each SAN at each node as a separate management domain. The architecture of the present invention does not merge SANs but does allow paths between to be assigned through the FC-AL scheme, thereby providing a mapped model for forwarding paths through the FC RPR. Distinct FC-AL loops can be supported within a FC-RPR service for multiple customer support. Each port in the FC-RPR is allocated to only 1 FC-RPR service. The use of this message forwarding protocol assumes FC-AL support which is a legacy protocol set within the FC standards that still is in use in disk end systems today. Because the FC-AL addressing used is controlled by the user and hence not the carrier, this addressing scheme is particularly advantageous in a customer owned network, as the carrier has limited ability to manage and service without visibility/control of network addressing.

b). Fiber Channel Switch Addressing

According to another embodiment of the invention, each node within the ring is addressed as though it was one port of a distributed virtual FC switch (distributed). Internal addressing mechanisms are used for forwarding messages around the ring. With this addressing scheme, similar to Ethernet RPR, each switch port maintains a forwarding list and looks at address headers for each ingress packet to determine the egress port. Within the FC-RPR switch, an additional header is pre-pended to each frame to simplify forwarding on the ring. In contrast to the FC-AL addressing scheme above, this private addressing is carrier owned, enabling service management and enhanced security of the service. Header technologies that could be used include FC-AL, FC and IP/Ethernet headers. As mentioned above, FC-AL has a topology model that matches the RPR topology and can be directly used.

c). Transparent Domain Interconnect (TDI)

According to another embodiment of the invention, a Layer 2 (L2) tunneling technology referred to as Transparent LAN Service (TLS) can be used in the present invention to allow data from multiple customers to efficiently use the ring transport bandwidth on a shared network infrastructure while maintaining complete separation for each customers' data packets. With TLS, different customer groups are isolated from other users by creating customer-specific virtual private Ethernets (VPEs) on the carrier. Forwarding is based solely on customer specific VPE information, so each customer receives only its own data packets. TLS includes a 24 bit customer identification field referred to as a Transparent Domain Identifier, or TDI (58). TDI (based on IP/Ethernet) is already used for exchanging data between nodes within the Ethernet RPR. One advantage of using the TDI header in this architecture is that it permits existing RPR silicon to be used for forwarding commands in the Fiber Channel switch. The TDI is similar to the VLAN tag defined by the IEEE 802.1Q standard, but as a 24-bit field, TLS supports over 16 million TDIs versus the 4,096 VLANs supported by the 802.1Q standard. TLS allows each customer to see only its own devices; the customer is unaware of other network users. The customer does not need to know exactly how the packets are delivered, only that they are delivered to the proper sites without altering any of the customer's data, including 802.1 Q tags. Each customer receives only the data packets that belong to the TDI associated with the customer, even when customers use overlapping VLAN addresses. The TDI associated with a customer's packet is based on either the ingress port or the customer assigned 802.1Q tag. The SP assigns the TDI to customer sites depending upon their needs. Accordingly, remote metro nodes can be tied together by having the SP associate a common TDI to the sites. With such an arrangement, physically distributed storage devices are represented as one logical resource. Alternatively, the SP may use multiple TDIs to identify and segregate different types of traffic, restricting the access to that traffic to particular locations. For example, separate TDIs may be used to separate traffic within corporation, (for example separating legal and personnel traffic), to provide the appearance of logically different resources within a common physical storage device A TDI can even be used to connect the sites of different customers to provide secure L2 connectivity between those locations.

One benefit of using the TDI in this manner is that the payload of the data packet 52 is not limited to any particular protocol format. Thus, the common internal TDI header (which is also used with Ethernet devices) enables the two services operating under different protocols to share and access the capacity in the ring. If both services have same header formats and address spaces are distinct (non-overlapping) each service can identify its own packets and ignore others. The customer separation features of the TDI addressing scheme also enables simpler allocation and provisioning of bandwidth and services. For example, TDI could be used in combination with a service provisioning architecture such as that described in U.S. patent application Ser. No. 09/930,119, filed Aug. 15, 2001 by Schofield et al, entitled "System, Device and Method for Managing Services in an Optical Communication System", incorporated herein by reference.

For example, by using a TDI header on the message forwarding frame which correlates exactly to the header that is used for Ethernet communication, an Ethernet service and a Fibre channel service can share the same physical capacity (assuming that they have a common addressing space that doesn't overlap). Fibre channel blades can be mapped with one set of TDIs and Ethernet blades coming into this service can be mapped with a different set of TDIs. Because nodes using this protocol ignore packets having unrelated TDIs, an Ethernet packet will by default never try to Egress on a Fibre channel port and visa versa.

Such a system that enables the sharing of capacity between different protocol devices is attractive because the different devices associated with the different protocols generally have different motivations for accessing the shared capacity. For example, a network may experience a large amount of LAN traffic during the day time. The LAN devices will use the capacity during this time. However, at night time, when storage backup is typically performed, the Fibre Channels may dominate the capacity use. In addition, by including functionality in the network that permits different service levels to be provided to different customers at different times, the network can easily be controlled so that the capacity is directed to customers when needed.

3. Extended Reach Capabilities

Thus far a bandwidth provisioning mechanism has been described which controls which node is allocated capacity on a ring during a given time interval. In addition, an addressing scheme has been described which is used to tag the packet provided from the selected source with the destination address. The present invention also includes an extended reach mechanism which is used to ensure that the modified Fibre Channel packet reaches the proper destination in accordance with standard Fibre Channel delivery assumptions.

Fibre Channel networks are inherently limited by latency, where latency is the transmission time for a data packet or signal to propagate between two nodes in a network. The latency generally increases as the distance between nodes increases. In particular, the Fibre Channel packet size is large (2 Kbytes), compared to traditional IP packet sizes (1500 bytes). Because the Fibre Channel packet is so large and latency dependent, it is desirable to ensure that a Fibre Channel packet is not transmitted to a destination unless there is capacity at the destination to store the packet, as frequent retransmission of large size packets is undesirable. In Fibre Channel parlance the 'capacity' for storing data packets is referred to as a number of buffers at the destination node. Fibre Channel systems are generally referred to as ingress controlled systems because a source cannot transmit to the destination unless there is sufficient ingress buffer capacity at the destination node.

In order to adequately support the Fibre Channel protocol within the ring network, and thereby be able to leverage several of the ring features, an extended reach mechanism is provided in the present invention to ensure that ingress controlled packet forwarding schemes can be supported by the architecture. One method of enabling ingress forwarding to be performed is through pre-allocation of buffers at all intermediate nodes between a source and destination. However, such a solution is not scalable in a system with many intermediate nodes and large packet sizes.

An alternative method for handling ingress controlled packet forwarding in the ring is an extended reach mechanism, such as that described in pending application Ser. No. 10/379,611 filed Mar. 5, 2003 by Pierre Miller and entitled "Method and System for Extending the Reach of a Data Communications Channel Using a Flow Control Interception Device," (hereinafter 'Miller') incorporated herein by reference. The flow control interception device of Miller uses a flow control signal that is forwarded from a neighboring device in a node to an upstream neighboring device. The flow control signal is used to indicate when the downstream device is capable of receiving data. A sending device transmits data to a receiving device only when the receiving device is ready to accept the data.

In brief overview, the extended reach communication system of Miller provides a method and system for controlling the flow of data within the channel to reduce or eliminate latency-induced throughput reduction. Consequently, the reach of the communication channel is extended.

Figure 6:
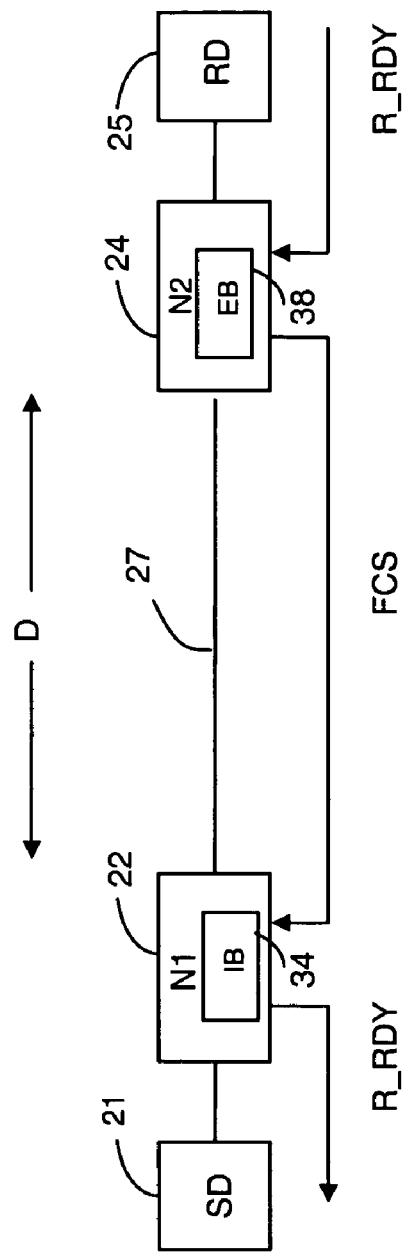
FIG. 6 is a block diagram illustrating exemplary signaling provided between two nodes in the Fibre Channel ring of the present invention for controlling packet forwarding between the nodes.

Referring briefly to FIG. 6, a block diagram of the operation of the extended reach communication mechanism on the ringlet 27 interconnecting node N1 22 and node N2 24 is shown. Sending device (SD) 21 seeks to forward data to receiving device (RD) 25, which are coupled together via Node 22, ringlet span 27 and node 24. Each node may include one or more ingress buffers for storing packet data that is to be transmitted to other nodes in the ring. In addition, each node may include one or more egress buffers for storing data that is to be serviced by capacity associated with the node. According to the extended reach mechanism of Miller, a sending node will not transfer data to a receiving node if a flow control signal (FCS) is asserted to indicate to the sending node that an insufficient number of buffers are available at the receiver for accepting the packet. Thus the absence of an FCS signal is used to indicate to an upstream sending node that buffer capacity is present at the downstream node. Ready signals (R_RDY) are used locally at the nodes to indicate available capacity. Thus, at the destination node the R_RDY signal indicates that a switch has processed a command from an Egress buffer, and is able to accept another command (e.g., empty the egress buffer). The R_RDY signal from the Ingress buffer to the Source indicates that the ingress buffer capacity is available for use by the source device.

For example, in operation, the sending device 21 transmits a data frame 16 to the node 22. If the node 22 does not receive a flow control signal (FCS) transmitted across the ringlet link 27 from node 24, the node 22 transmits the frame 16 across the link 27 to the node 24 and sends an R_RDY signal to the sending device 21. However, if the node 22 receives a flow control signal, the frame 16 is stored in the ingress buffer 34 and no R_RDY signal is sent to the sending device 21. When the flow control signal is no longer received or is deactivated, the frame 16 is "released" from the ingress buffer 34 and transmitted across the link 27 to the node 24.

If the receiving device 25 is available to process the frame 16, the node 24 transmits the received frame 16 to the receiving device 25. The receiving device 25 provides an R_RDY signal to node 24 to "release" the data frame from the egress buffer of the node when the receiving device 25 can accommodate the frame 16.

If the data held in the egress buffer 38 of the node 24 exceeds a first predetermined quantity of data, the node 24 transmits a flow control signal (FCS) to the node 22. As described above, the node 22 does not transmit frames 16 across the link 27 if it receives a flow control signal. When the amount of data in the egress buffer 38 decreases below a second predetermined value, the node 24 stops sending the flow control signal. Consequently, the node 22 can resume transmission of frames 16 across the link 27.

According to one embodiment of the invention, the extended reach capabilities described with regard to FIGS. 4 and 6 are included each node in the ring. Each node establishes point to point connections with other nodes, with the handshake signals being exchanged between the source and destination nodes in the point to point connection. Taxation or dummy packets are reserved for the spans of the connection prior to forwarding the packets to the destination, thereby enabling packets to flow through the ring from the point to the destination when the destination device indicates that it is ready to accept the transmission. As a result, packet delivery between any pair of nodes in the ring is guaranteed. Thus the extended reach mechanism permits the guaranteed point to point packet delivery behavior expected by the Fibre Channel protocol may be provided in a ring based system.

4. Optional Error Correction Mechanisms

Operable Fibre Channel connections are required to have a Bit-Error-Rate of $10^{-12}$. Such error rates are feasible when the storage devices are relatively proximate, but the present invention proposes the distribution of Fibre Channel devices at metro distances. As such, mechanisms should be included in the present invention to ensure that the Bit Error Rate of transmissions between nodes is below the stated Fibre Channel standard.

Figure 7:
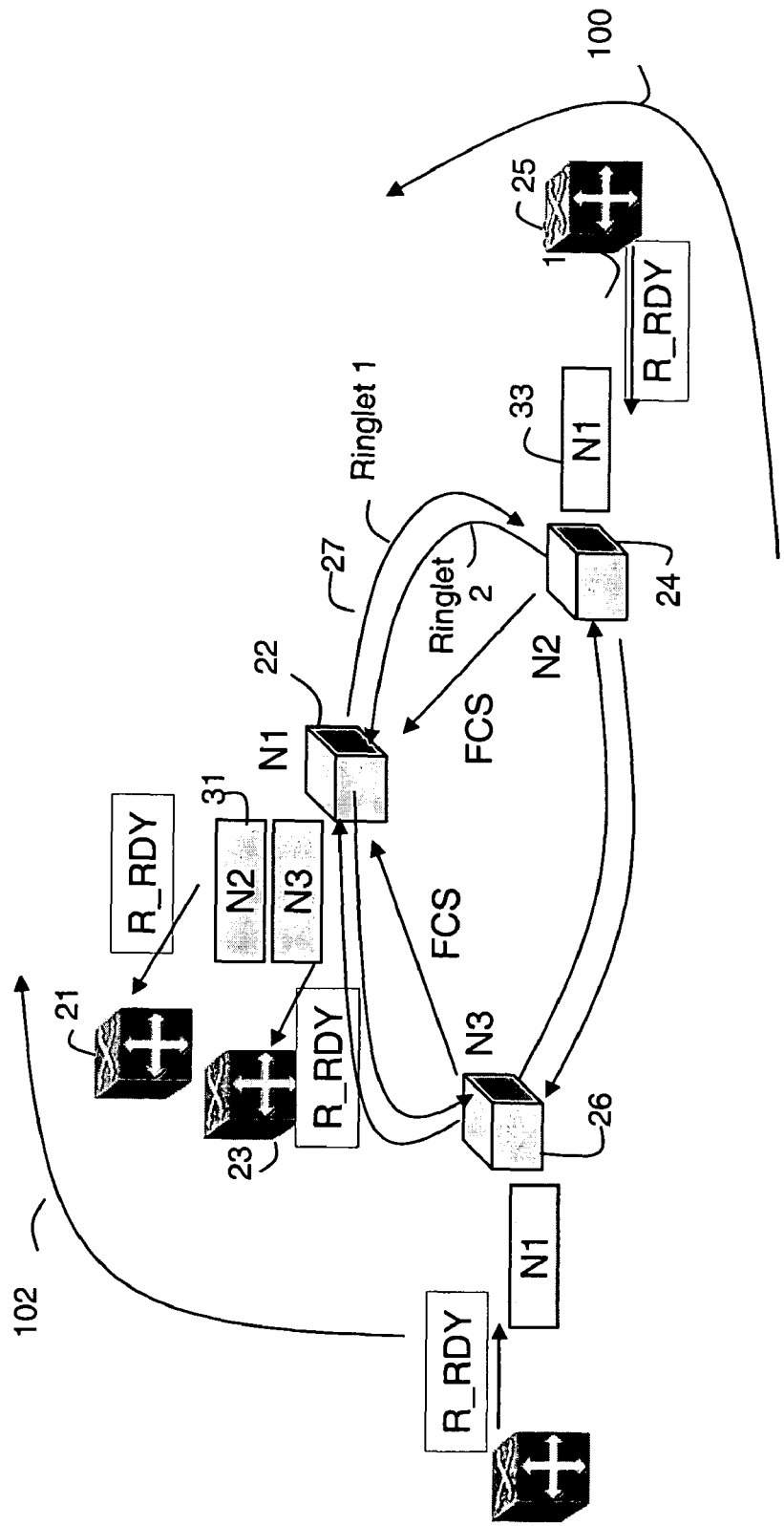
FIG. 7 is a diagram of the ring connection of the virtual switch of FIG. 3 and is provided to illustrate the redundant communication paths that inherently provide error correction capabilities in the architecture.

Existing RPR networks include a set of solutions that provide carrier grade performance which conforms to or exceeds the desired Fibre Channel BER criteria. For example, referring now to FIG. 7, because the RPR ring networks generally are comprised of two counter-rotating ringlets, communication failures on one direction 100 on a link can easily be forwarded around the ring in the other direction 102. Thus in essence the RPR network provides full redundancy in the transmission paths from a source to a destination, and no explicit error correction mechanisms need to be provided to support the integration of the two networks.

In an alternative embodiment, the redundancy can be capitalized on by double launching transactions in the ring, in both directions, to provide full transaction redundancy, although this degrades the overall bandwidth utilization of the network.

In still another embodiment, the Fibre Channel ingress and egress buffers (such as buffers 31 and 33 respectively in FIG. 7) associated with the Fibre Channel communications can advantageously be controlled and used as temporary storage of packets in flight for the purposes of error correction.

Figure 8:
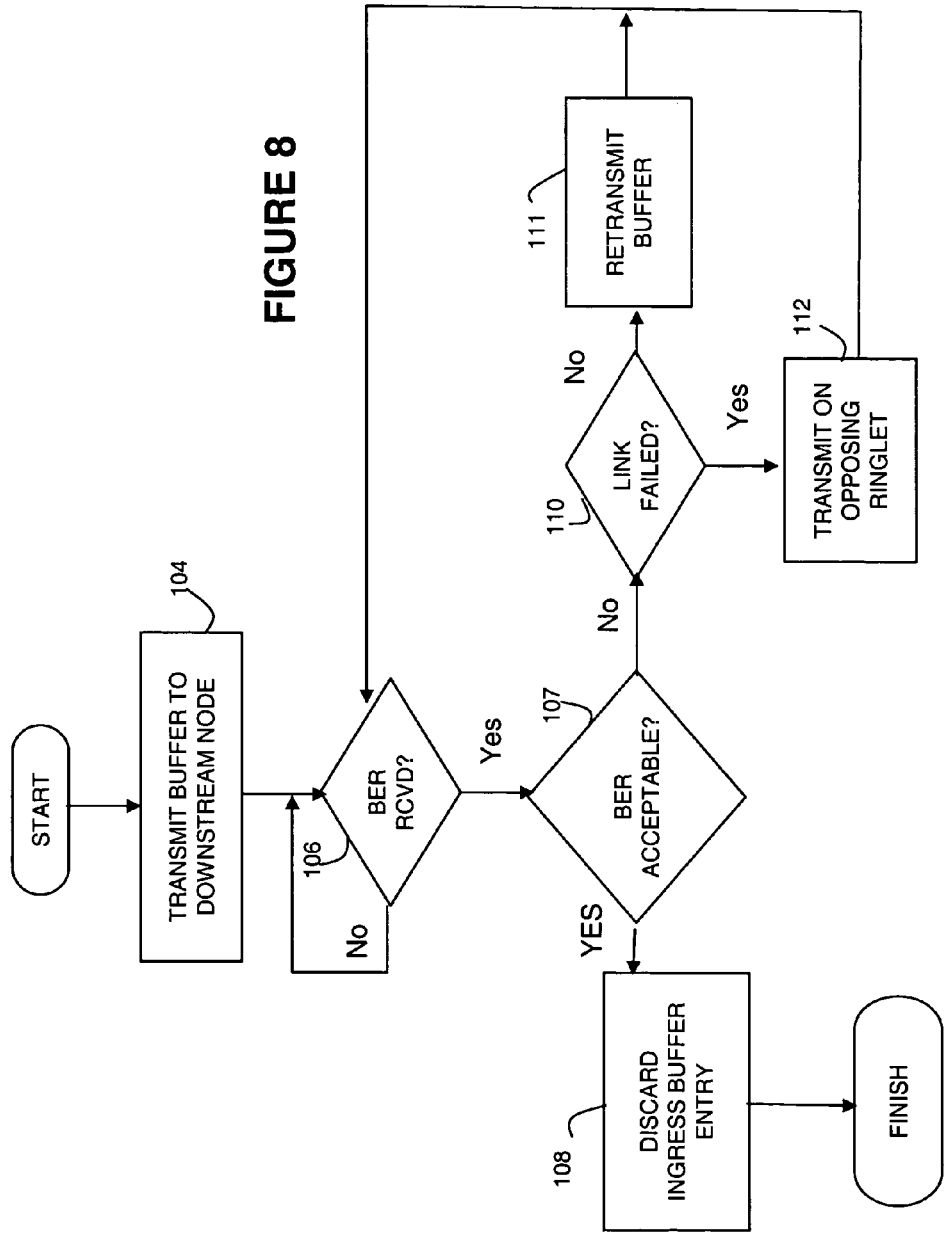
FIG. 8 is a flow diagram illustrating several exemplary steps that may be taken in one optional error correction mechanism of the present invention.

For example, referring now to FIG. 8, exemplary steps that may be taken in an error correction process of the architecture of the present invention will now be described. At step 104 a node forwards one or more buffers to the downstream neighbor on the ring, and retains a copy of the buffer in an ingress buffer store or other memory. At step 106 the node enters a wait state, waiting for the BER for the transmission to be received from the upstream ringlet. At step 107, the received BER is evaluated to determine whether it is within an acceptable range. For example, each node may include error correction logic that is capable of correcting single or double bit errors in a transmission. If the BER is within an acceptable range, the ingress buffer contents are discarded at step 108.

If the BER is not within an acceptable range, at step 110 it is determined whether the BER indicates that the link has failed. Such an indication may result if many attempts have been made to retransmit the data over the link, or if the BER indicates that no data was received. If the link has not failed, at step 111 the node retransmits the packet stored in the ingress buffer, and returns to step 106 to await the result of the transmission. If at step 110 it is determined that the link has failed, then at step 112 the node initiates forwarding around the ring in the other direction.

Accordingly, the present architecture by its architecture provides the desired rate of performance typically desired in a Fibre Channel system, and it is not necessary to add additional error correction mechanisms. However, should additional security or accuracy be desired, several embodiments have been disclosed which enable a user to ensure that a desired performance is achieved.

5. Exemplary Node Components

Figure 9:
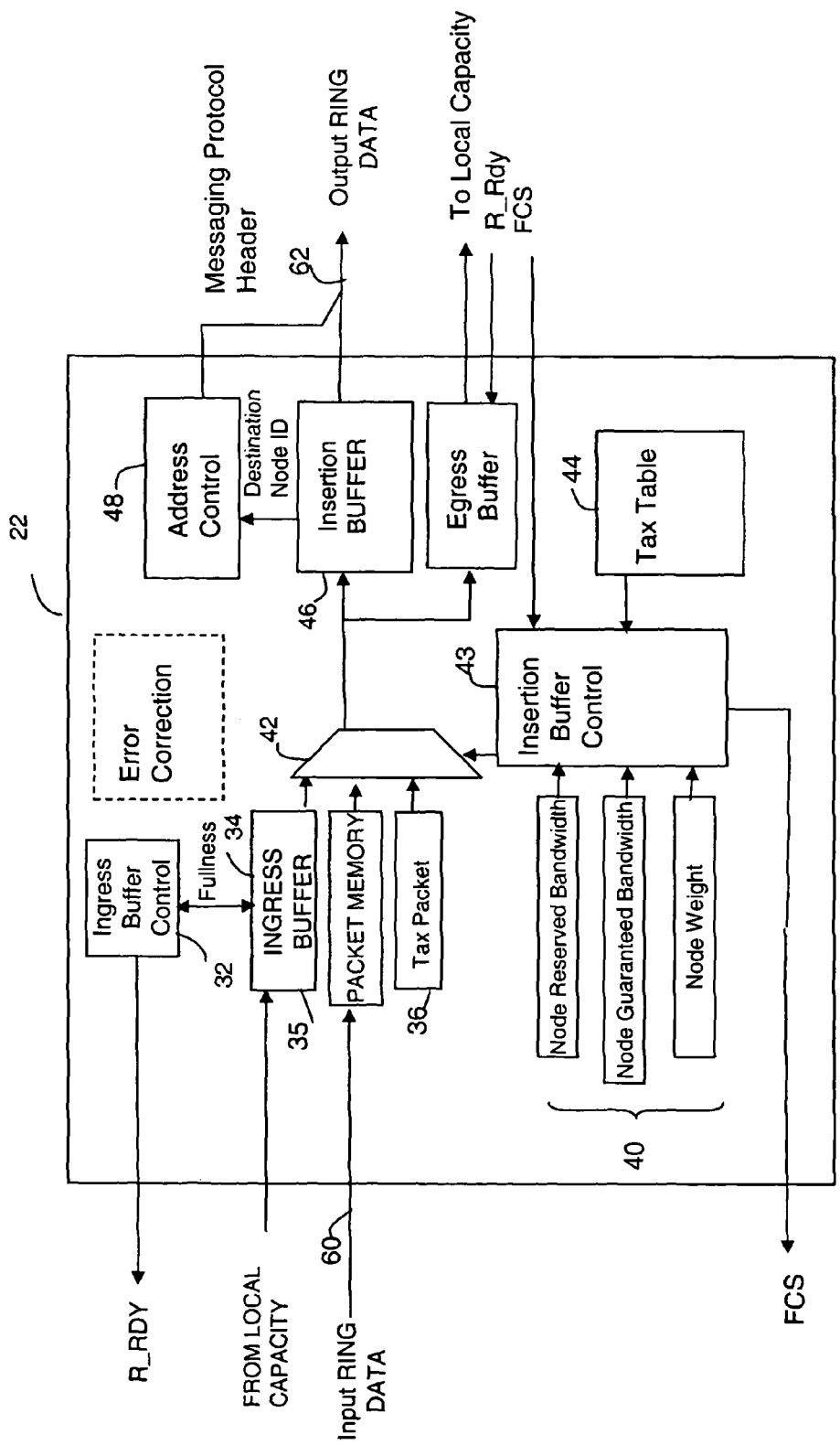
FIG. 9 is a block diagram illustrating several exemplary components that may be included in a node interconnected in the distributed virtual fiber switch of the present invention.

Referring now briefly to FIG. 9, a block diagram of one embodiment of a node that may be incorporated in the distributed virtual Fibre Channel switch of the present invention is shown. It should be understood that the blocks illustrated in FIG. 9 are meant to represent functional operations performed at the node, and there is no limitation intended by the delineation of the functions. In addition, it is understood that the functionality may be implemented in hardware, software or some combination thereof.

As described above, each node includes various mechanisms that facilitate Fibre Channel operations in a ring based network, as well as including mechanisms that enable features of the RPR to be leveraged by coupled Fibre Channel devices. In general each node includes an input ring data path 60 and an output ring data path 62. Although each node includes input data paths for both ringlets, for purposes of clarity only one ring datapath is shown herein.

Data is received from a coupled node on the input ring datapath 60. The data, once it is received at the node, may either transit through the node via packet memory 35, select logic 42 and to insertion buffer 46, or be forwarded to a local connection via egress buffer 47. According to one implementation of the resilient packet ring technology, an insertion buffer 46 allows for fast insertion of various packet data onto the resilient ring for each time slot. Details regarding the insertion buffer technology are described in more detail in co-pending application Ser. No. 09/441,514, entitled Methods and Devices for Adding and Removing Data from Serial Data Streams, filed on Nov. 17, 1999 by Hurren et al, and incorporated herein by reference.

In FIG. 9 a set of registers 40 are explicitly shown, including Node Reserved Bandwidth register, Node Guaranteed Bandwidth register and Node Weight. Although these registers are shown explicitly in FIG. 9 it should be understood that these values may alternatively be stored in a data structure in memory, or within a packet processor (not shown) for ease of access, and thus the present invention is not limited to any particular mode of storing these values. As described by Peng, the values in the registers are programmable by a network administrator and used to control the ring bandwidth allocated to transmissions initiated by the node 22.

Also illustrated in FIG. 9 is a tax table 44. As described in Peng, the tax table 44 is a table having an entry for each of the other nodes that are coupled to the given node in the ring. Should the host node be coupled to more than one ring, separate tables are maintained for each ring. Each entry stores a tax value indicative of an amount of bandwidth that needs to be transferred to the respective other node for any packet transmissions by the host node that transit the other node. For example, referring again to FIG. 3, the table 30 would include entries for node 2 and node 3, identifying the node 2 tax and node 3 tax that needs to be 'paid' to the respective nodes for traffic forwarded to downstream nodes.

Insertion buffer control 43 receives input from the tax table 30 as well as the register set 40 when determining what type of packet to forward to the next downstream node. The insertion buffer logic 43 thus provides a selection control to selector 42, which selects one of a group of available packets for transmission. As shown in FIG. 9, the available packets may include ingress packets received from a local capacity, packet data received at the node and intended for transfer to the neighboring node, tax packets for releasing bandwidth to other nodes.

In one embodiment the flow control signal (FCS) is asserted by the insertion buffer controller, which monitors the fullness of the packet memory at the node to determine whether there is sufficient buffer capacity to accept upstream packets. The insertion buffer control also receives the FCS signal from a downstream node, and uses this information to control delivery of the packets to the insertion buffer. Error Correction logic, illustrated as a dashed element 51, may advantageously be provided and operated as described above although it is not a necessary element of node 22.

Address control logic 48 operates to layer the desired header onto packet data that is to be forwarded out of the node. As mentioned with regard to FIGS. 5A-5D, the message protocol header may take on a variety of forms and values, some of which may be used for customer separation control. According to one embodiment, the address control is programmable and may be used to associate address spaces with service provisioning.

The general flow of a packet through node 22 is as follows. A packet is received at the node either via the input ring data path or the ingress buffer. Although only one ingress buffer is shown in FIG. 9 it should be understood that there may be a number of ingress buffers, each associated with a different ingress path to the node (i.e., a different customer site on a coupled Fibre Channel switch, for example). Ingress buffers are filled in response to the state of the R-RDY signal provided by the ingress buffer to the local capacity.

Once a packet is received and stored in a buffer of the node 20, a selection process selects one of the packets for forwarding into the network. The selection process takes into account programmed bandwidth allocations for each of the node, as well as available packets for each of the nodes. Certain types of packets may be given a higher priority, for example retransmissions of ingress buffer contents may be given higher priority than the transit flow through the node. The selected packet is forwarded to the insertion buffer 46, where the destination address is extracted and forwarded to the address control logic 48. The address control logic prepends a header onto the fiber channel packet in accordance with the message forwarding protocol of the system. When the downstream node indicates that sufficient buffers are available, the packet is forwarded on the output ring data path 62 to the neighboring node in the ring.

Accordingly an architecture has been described that enables distributed storage capacity to be shared as though accesses were being made to a Fiber Channel Switch. The distributed capacity may include Fibre Channel devices and thus a method for addressing Fibre Channel devices coupled in a resilient ring has been provided. Application of RPR address management and header format allows customer separation, data security, and service separation leading to proper management of overlapping FC network namespaces without deleterious effects. Expected Fibre Channel behavior and reliability are attained in the architecture of this invention through the application of bandwidth provisioning and extended reach mechanisms at each node in the ring. The bandwidth provisioning mechanisms ensure that access is provided to the communication links of the ring for each node according to a defined bandwidth distribution. The extended reach mechanisms of the invention ensure that the standard Fibre Channel packet delivery assumptions are satisfied. Forwarding Error Correction techniques can be used to ensure that a Bit Error Rate of the Fibre Channel communications on the ring is comparable to a Bit Error Rate of a typical Fibre Channel network.

Accordingly several embodiments of a method an apparatus for building a distributed virtual Fibre Channel switch have been provided. Although the Fibre Channel protocol has been described, it is readily apparent that the mechanisms used to emulate Fibre Channel behavior on the ring could also be applied to other types of storage protocols, and thus the present invention is not limited to any particular storage protocol.

The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A distributed virtual storage switch comprising:
   a plurality of metro spaced nodes, wherein the metro spaced nodes are coupled in a ring;
   a first one of the nodes being in communication with a first storage device via a first storage switch; and
   a second one of the nodes being in communication with a second storage device via a second storage switch;
   a third one of the nodes accessible by the first and second nodes using logical point to point connections between nodes on the ring, the third node allocating bandwidth to the first and second nodes by placing a number of empty frames in transmissions from the third node, the empty frames being accessible by, and replaced by data by, the first and second nodes, the number of empty frames being in a fixed proportion to a number of non-empty data frames in transmissions from the third node; and
   the plurality of nodes of the ring providing a virtual storage switch for reaching the first and second storage devices.

2. The distributed virtual switch of claim 1, wherein a physical link capacity between at least two of the nodes on the ring is allocated to one of the plurality of logical point to point connections according to a bandwidth provisioning mechanism.

3. The distributed virtual switch of claim 2 wherein the bandwidth provisioning mechanism is programmable.

4. The distributed virtual switch of claim 2, wherein the bandwidth provisioning mechanism selects one of the plurality of logical point to point connections to use the physical link capacity according to a relative service level associated with the logical point to point connection.

5. The distributed virtual switch of claim 1, wherein one or more users may be associated with the plurality of nodes, and wherein the distributed virtual switch further comprises an addressing mechanism enabling separation of communications between the one or more users.

6. The distributed virtual switch of claim 5, wherein the one or more of the users are associated with one or more customers.

7. The distributed virtual switch of claim 6 wherein the addressing mechanism is programmable.

8. The distributed virtual switch of claim 1 further comprising an extended reach mechanism enabling point to point logical storage protocol exchanges over the ring.

9. The distributed virtual switch of claim 8 wherein the extended reach mechanism is programmable.

10. The distributed virtual storage switch of claim 1, wherein the first one of the nodes asserts a flow control signal when the first one of the nodes lacks a sufficient number of buffers available to receive a packet from another node.

11. A storage node comprising:
a local interface for exchanging data with one or more coupled storage devices; and
a ring interface for exchanging communications with at least one metro connected node, the communications having a message forwarding protocol corresponding to a storage protocol of the storage devices, the message forwarding protocol prepending a forwarding header to storage protocol packets to facilitate the message forwarding, the storage protocol being a Fiber Channel protocol, the forwarding header including a Transparent Domain Interconnect (TDI) address, and the storage node allocating bandwidth to the at least one metro connected node by placing empty frames in transmissions from the storage node, the empty frames being accessible by, and replaced by data by, the at least one metro connected node, the ring interface including a bandwidth provisioning mechanism for controlling access to a link coupling the storage node to the at least one metro connected node, the bandwidth provisioning mechanism including a device for storing a value associated with a bandwidth available to the storage node, the value for controlling a ratio of packets to be locally sourced by the storage node versus packets to be transmitted through the storage node on the ring interface.

12. The storage node of claim 11 wherein the value is programmable.

13. The storage node of claim 11, wherein the ring interface further comprises an extended reach mechanism for simulating a packet delivery behavior of the storage protocol using the message forwarding protocol.

14. The storage node of claim 13 wherein the extended reach mechanism includes flow control logic to selectively block transmissions by the storage nodes onto the at least one metro connected node depending upon available buffer capacity at the at least one node.

15. The storage node of claim 14 wherein the flow control logic is programmable.

16. The storage node of claim 11, wherein the addressing mechanism is used to provide customer separation.

17. The storage node of claim 14, wherein the storage protocol is a Fiber Channel protocol and the forwarding header is selected in accordance with the Fiber Channel Arbitrated Loop protocol.

18. The storage node of claim 11, wherein the storage protocol is a Fiber Channel protocol and the forwarding header is includes a switched Fiber Channel.

19. The storage node of claim 11, further comprising an error correction mechanism.

20. The storage node of claim 11, wherein a number of the empty frames is in a fixed proportion to a number of non-empty data frames in transmissions from the storage node.

21. A distributed virtual switch comprising:
a plurality of nodes interconnected in a ring, at least one of the nodes being a storage node operating according to a storage protocol; and
a packet exchanger at each of the nodes, each packet exchanger exchanging packets with the storage node, the packets comprising:
storage protocol communications in accordance with the storage protocol: and
a ring forwarding header pre-pending the storage protocol communications, the ring forwarding header being a Transparent Domain Identifier (TDI); and
each packet exchanger further translating a first packet delivery behavior of the ring into a second packet delivery behavior of the storage protocol, a first one of the nodes allocating bandwidth to at least one other node by placing a number of empty frames in transmissions from the first node, the empty frames being accessible by, and replaced by data by, the at least one other node, the number of empty frames being in a fixed proportion to a number of non-empty data frames in transmissions from the first node.

22. The distributed virtual switch of claim 21 wherein the storage protocol is a Fiber Channel protocol.

23. The distributed switch of claim 21 wherein the ring forwarding header is also used to encapsulate Internet Protocol (IP) communications, thereby enabling both IP protocol and storage protocol devices to utilize the ring.

24. The distributed switch of claim 21 wherein the ring forwarding header comprises a Fiber Channel Switch address.

25. The distributed switch of claim 21 wherein the ring forwarding header is selected in accordance with a Fiber Channel Arbitrated Loop protocol.

26. A method of transferring storage communications associated with a storage protocol between remotely distributed nodes coupled in a ring, the method including:
translating a packet delivery behavior of the ring into an expected packet delivery behavior of the storage protocol so that it appears that the nodes on the ring are point to point coupled, the translating including encapsulating the storage communications in a message forwarding header, the message forwarding header being a Transparent Domain Identifier (TDI); and
allocating bandwidth, by a first one of the remotely distributed nodes, to at least one other remotely distributed node by placing a number of empty frames in transmission from the first one of the remotely distributed nodes, the empty frames being accessible by, and replaced by data by, the at least one other remotely distributed node, the number of empty frames being in a fixed proportion to a number of non-empty data frames in transmissions from the first one of the remotely distributed nodes.

27. The method of claim 26 further including the step of controlling a bandwidth allocated to each of the nodes in the ring.

28. The method of claim 26 wherein at least one of the nodes in the ring is a node operating according to an Internet Protocol (IP), and wherein the method further includes the step of encapsulating internet protocol communications using the TDI.

29. The method of claim 26 wherein the message forwarding header is selected according to a Fiber Channel Arbitrated Loop (FC-AL) protocol.

30. The method of claim 26 wherein the message forwarding header includes a Fiber Channel switch address.

31. The method according to claim 26 further including the steps of identifying a bit error rate in communications between two nodes in the ring and selectively altering transmission paths between the two nodes in response to the identified bit error rate.

* * * * *